July 14, 1964 P. RAVENHILL ETAL 3,141,098

HIGH SPEED ELECTRONIC SWITCHING CIRCUIT

Filed June 7, 1962

INVENTORS
PETER RAVENHILL
HAROLD SMITH
BY
H. H. Losche
Paul S. Collignon
ATT'YS.

3,141,098

HIGH SPEED ELECTRONIC SWITCHING CIRCUIT

Peter Ravenhill, Baltimore, and Harold Smith, Severna Park, Md., assignors, by mesne assignments, to the United States of America as represented by the Secretary of the Navy Filed June 7, 1962, Ser. No. 200,900
5 Claims. (Cl. 307—88.5)

The present invention relates to a high speed, high frequency, electronic switching device and more particularly to a high speed electronic switching device operable by positive and negative voltage signals applied to an external gate.

High speed switches are frequently required in radar and other applications and it is often necessary that these switches be capable of being actuated by a wave form of relatively high frequency.

Many heretofore known electronic switches are of a shunt type in which the transmission path through the device is short-circuited when transmision is interrupted. The shunt type of switch imposes a considerable load or impedance on the input circuit which frequently produces an undesirable reaction on the input circuit or device.

Also, many heretofore known switching devices which are normally switched by application of a rectangular gate voltage produce highly undesirable transients in the output signal.

In the present invention, first and second unidirectional impedance elements are provided between an input terminal and an output terminal, and a third unidirectional impedance element is connected to the common junction point of the first and second unidirectional impedance elements. When a positive voltage signal is applied to a gating terminal, the first and second unidirectional impedance elements are biased such that forward conduction occurs, and the third unidirectional impedance element is biased such that it is cut off. This is the condition of the switch in the transmission mode. When a negative voltage signal is applied to the gating terminal, the first and second unidirectional impedance elements will not conduct while the third diode will conduct, thus presenting a ladder attenuator of high attenuation to the input signal. With the use of planar silicon diodes as the unidirectional impedance elements in the present invention, it is possible to obtain switching times of the order of 20 nanoseconds.

It is therefore a general object of the present invention to provide an improved high speed electronic switch.

Another object of the present invention is to provide a solid state, high frequency, high speed switch of low power consumption and moderate input trigger requirements.

Other objects and advantages of the present invention will be readily appreciated as the same becomes better understood by reference to the following detailed description when considered in connection with the accompanying drawing in which like reference numerals designate like parts throughout the figures thereof and wherein.

Figure 1:
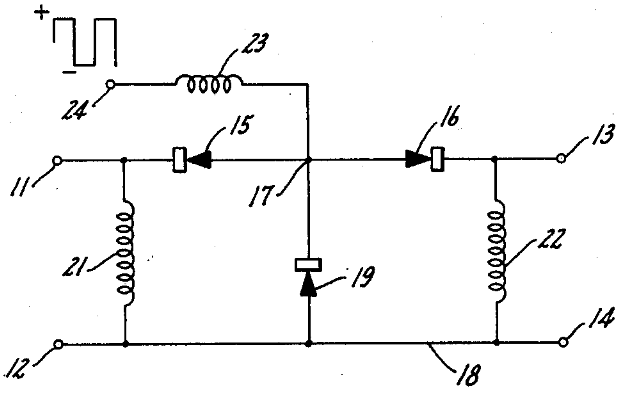
FIGURE 1 is a circuit diagram of one embodiment of the present invention.

Referring now to the drawing, there is shown in FIGURE 1 a pair of input terminals 11 and 12 and a pair of output terminals 13 and 14. The input and output terminals might be of coaxial configuration. A pair of unidirectional impedance elements, such as crystal diodes 15 and 16, are provided between terminals 11 and 13. The cathode of diode 15 is connected to terminal 11 and the cathode of diode 16 is connected to terminal 13, with the anodes of diodes 15 and 16 being connected together at junction point 17. A connecting lead 18 is provided between terminals 12 and 14, and a third unidirectional impedance element, such as crystal diode 19, has its anode connected to lead 18 and its cathode connected to junction point 17. A choke 21 is connected across input terminals 11 and 12, and likewise, a choke 22 is connected across output terminals 13 and 14. Chokes 21 and 22 provide a direct current path for the diodes without increasing the loss of the switch. A third choke 23 is connected between a gating terminal 24 and junction point 17, and this choke serves to isolate the switch from the switching voltage source so that no loss of RF energy occurs through this source.

Figure 2:
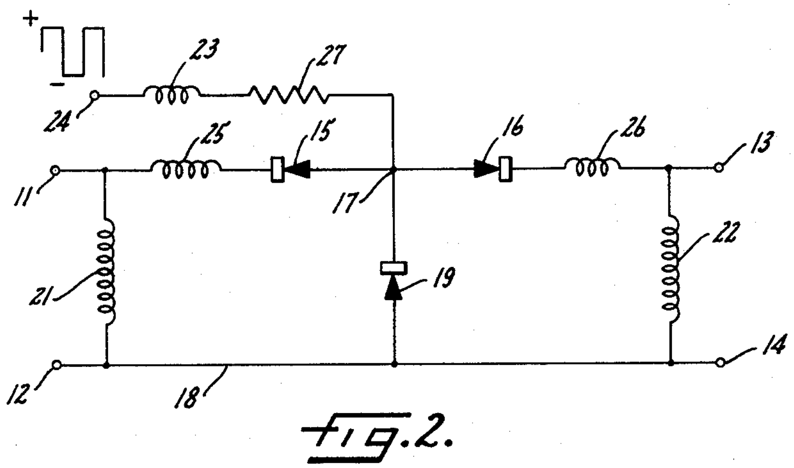
FIGURE 2 is a circuit diagram of another embodiment of the present invention.

A second embodiment of the present invention is shown in FIGURE 2 of the drawing that is similar in structure and function to the embodiment shown in FIGURE 1 of the drawing. The insertion loss of the switch is governed by the ratio of the load impedance presented to the switch to the impedance of crystal diodes 15 and 16 in the conducting mode. As this ratio should be as high as possible, and as the impedance of the diodes is established when the particular diodes are selected, chokes 25 and 26 are provided to suitably match the circuit to raise the impedances to a desired value and thus reduce the insertion loss of the switch in the conducting mode to an acceptable value. A limiting resistor 27 is connected in series with choke 23 and limits the direct current through the crystal diodes to a desired value.

In operation, when a positive voltage is applied to gating terminal 24, diodes 15 and 16 will be biased such that forward conduction occurs and diode 19 is biased such that it is cut off. This condition represents a "closed" or transmission mode and an input signal that is applied to terminals 11 and 12 will pass through the switch to terminals 13 and 14. When a negative voltage is applied to gating terminal 24, diodes 15 and 16 will be cut off and diode 19 will conduct, thus presenting a ladder attenuator of high attenuation to the input signal. Chokes 21 and 22 that are provided across the input terminals and the output terminals, respectively, provide a direct current path to ground. By using properly selected planar silicon diodes, switching times of the order of 20 nanoseconds are attainable.

It can thus be seen that the present invention provides an improved high speed electronic switch that is simple in construction and requires a minimum number of parts. Obviously many modifications and variations of the present invention are possible in the light of the above teachings. It is therefore to be understood, that within the scope of the appended claims, the invention may be practiced otherwise than as specifically described.

What is claimed is:

1. A high speed electronic switching device operable by positive and negative voltage signals applied to an external gate comprising:
   - input terminal means,
   - output terminal means,
   - first and second crystal diodes each having an anode and a cathode, said anodes being connected together at a junction point, said cathode of said first crystal diode being connected to said input terminal means, and said cathode of said second crystal diode being connected to said output terminal means,
   - a gating terminal connected to said junction point,
   - a third crystal diode having a cathode connected to said junction point and an anode connected to both said input terminal means and said output terminal means, and
   - a first choke connected across said input terminal means and a second choke connected across said output terminal whereby said chokes provide direct current paths to ground.

2. A high speed electronic switching device operable by positive and negative voltage signals applied to an external gate comprising:

input terminal means, output terminal means, first and second crystal diodes each having an anode and a cathode, said anodes being connected together at a junction point, said cathode of said first crystal diode being connected to said input terminal means, and said cathode of said second crystal diode being connected to said output terminal means, a gating terminal connected to said junction point, isolating means connected betwen said gating terminal and said junction point for reducing loss of RF energy through said gating terminal, a third crystal diode having a cathode connected to said junction point and an anode connected to both said input terminal means and said output terminal means, and separate means connected across said input terminal means and said output terminal means for providing direct current paths to ground.

3. A high speed electronic switching device as set forth in claim 2 wherein said isolating means comprises a choke.

4. A high speed electronic switching device operable by positive and negative voltage signals applied to an external gate comprising:

(*a*) input terminal means, (*b*) output terminal means, (*c*) first and second crystal diodes each having an anode and a cathode said anodes being connected together at a junction point, said cathode of said first crystal diode being connected to said input terminal means, and said cathode of said second crystal diode being connected to said output terminal means, (*d*) a gating terminal connected to said junction point, (*e*) isolating means connected between said gating terminal and said junction point for reducing loss of RF energy through said gating terminal, (*f*) a third crystal diode having a cathode connected to said junction point and an anode connected to both said input terminal means and said output terminal means, and (*g*) first and second chokes connected one each across said input terminal means and said output terminal means for providing direct current paths to ground.

5. A high speed electronic switching device as set forth in claim 4 wherein said isolating means comprises a choke.

References Cited in the file of this patent

UNITED STATES PATENTS

| | | |
|---|---|---|
| 2,959,689 | Gilbert | Nov. 8, 1960 |
| 2,994,789 | Gottfried | Aug. 1, 1961 |